US010235351B2

(12) United States Patent
Lee et al.

(10) Patent No.: US 10,235,351 B2
(45) Date of Patent: Mar. 19, 2019

(54) ELECTRONIC DOCUMENT EDITING APPARATUS CAPABLE OF INSERTING MEMO INTO PARAGRAPH, AND OPERATING METHOD THEREOF

(71) Applicant: HANCOM FLEXCIL, INC., Seongnam-si, Gyeonggi-do (KR)

(72) Inventors: Changil Lee, Gwangju-si (KR); Jihoon Park, Seongnam-si (KR)

(73) Assignee: HANCOM FLEXCIL, INC., Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/529,990

(22) PCT Filed: Aug. 8, 2016

(86) PCT No.: PCT/KR2016/008716
§ 371 (c)(1),
(2) Date: May 25, 2017

(87) PCT Pub. No.: WO2017/078251
PCT Pub. Date: May 11, 2017

(65) Prior Publication Data
US 2017/0329756 A1    Nov. 16, 2017

(30) Foreign Application Priority Data

Nov. 3, 2015    (KR) .......................... 10-2015-0153840
Dec. 7, 2015    (KR) .......................... 10-2015-0173028

(51) Int. Cl.
*G06F 17/20*    (2006.01)
*G06F 17/24*    (2006.01)
(Continued)

(52) U.S. Cl.
CPC .......... *G06F 17/241* (2013.01); *G06F 17/211* (2013.01); *G06F 17/30657* (2013.01); *G06F 3/04842* (2013.01); *G06F 17/30011* (2013.01)

(58) Field of Classification Search
CPC .................................................... G06F 17/241
See application file for complete search history.

(56) References Cited

U.S. PATENT DOCUMENTS 9,256,343 B1 *    2/2016   Stekkelpak ............ G06F 3/0481
2002/0010707 A1 *    1/2002   Chang .................... G06F 17/211
715/205

(Continued)

FOREIGN PATENT DOCUMENTS

KR    10-2014-0131863 A    11/2014

OTHER PUBLICATIONS

International Search Report in International Application No. PCT/KR2016/008716 dated Oct. 31, 2016.

*Primary Examiner* — Keith D Bloomquist
(74) *Attorney, Agent, or Firm* — Park, Kim & Suh, LLC

(57) ABSTRACT

The present invention provides a method of operating an electronic document editing apparatus capable of inserting a memo into a paragraph, the method including: when a user points a first point of a first paragraph among a plurality of paragraphs included in an electronic document and then inputs a memo insertion command for the first point, dividing the first paragraph into two paragraph blocks based on the first point of the first paragraph based on the memo insertion command, and generating a blank space for inserting a memo between the two paragraph blocks.

8 Claims, 6 Drawing Sheets

(51) Int. Cl.
  *G06F 17/21*   (2006.01)
  *G06F 17/30*   (2006.01)
  G06F 3/0484    (2013.01)

(56) References Cited

U.S. PATENT DOCUMENTS

2006/0123336 A1* 6/2006 Altman ................. G06F 17/211
                                              715/206
2007/0283288 A1  12/2007 Jeffery
2011/0202830 A1   8/2011 Iwema
2012/0290967 A1  11/2012 Scott
2014/0331174 A1  11/2014 Wen et al.

* cited by examiner

ELECTRONIC DOCUMENT EDITING APPARATUS CAPABLE OF INSERTING MEMO INTO PARAGRAPH, AND OPERATING METHOD THEREOF

CROSS-REFERENCE TO RELATED APPLICATIONS

This application is the National Stage filing under 35 U.S.C. 371 of International Application No. PCT/KR2016/008716, filed on Aug. 8, 2016, which claims the benefits of Korean Patent Application No. 10-2015-0153840, filed on Nov. 3, 2015, and Korean Patent Application No. 10-2015-0173028, filed on Dec. 7, 2015, the contents of which are all hereby incorporated by reference herein in their entirety.

TECHNICAL FIELD

The present invention relates to an electronic document editing technology for providing a memo function to an electronic document.

BACKGROUND ART

Recently, according to the wide supply of computers, smart phones, or tablet PCs, various kinds of electronic document-related programs, with which a user may read, write, and edit an electronic document by using a terminal device, have been released.

The electronic document-related programs include a word processor supporting basic writing and editing of a document, a spread sheet assisting data input, calculation, and a data management, and presentation programs assisting a presentation of a speaker.

There are many cases where the recently released electronic document-related programs provide a memo function enabling a user to attach a predetermined comment or add a footnote when the users read an electronic document by using the terminal device and there is an important sentence or phrase in the electronic document.

Commonly, when a user selects a specific point in a text included in the electronic document and executes a memory insertion command, the memo function in the electronic document displays a predetermined memo input box at the corresponding point and then supports the user to input a desired memo to the memo input box, or displays a predetermined memo input window at a right side or a lower end of an image in a portion, in which the text of the electronic document is displayed and supports the user to input the memo.

However, in the existing memo function, when the memo input box is displayed on the text of the electronic document, the text of the electronic document is hidden by the memo input box, so that the user actually cannot view the most important text of the electronic document, and when the memo is displayed at the right side or the lower end of the image of the text of the electronic document, the user may view the text of the electronic document, but it is difficult for the user to accurately match the memo input by the user and a paragraph or a sentence corresponding to the corresponding memo, so that the user may have difficulty in simultaneously viewing the memo and the contents corresponding to the corresponding memo.

Accordingly, in relation to the memo function in the electronic document, research on a technology, which when a user executes a memo insertion command for a specific point in a text of an electronic document, supports the user to simultaneously view a memo input by the user and a paragraph and a sentence corresponding to the corresponding memo to contribute to convenience for the user is needed.

SUMMARY OF THE INVENTION

Technical Problem

The present invention has been made in an effort to provide an electronic document editing apparatus capable of inserting a memo into a paragraph, and an operating method thereof, which, when a user points a first point of a first paragraph among a plurality of paragraph included in an electronic document and then inputs a memo insertion command for the first point, divide the first paragraph into two paragraph blocks based on the first point of the first paragraph based on the memo insertion command and generates a blank space for inserting a memo between the two paragraph blocks, so that even though the user inputs the memo into the blank space, the text of the electronic document is prevented from being hidden by the input of the memo, and since the input memo and a paragraph or sentences corresponding to the input memo are positioned at the same position, the user is supported to view the memo and the paragraph or sentences corresponding to the memo at a glance.

Technical Solution

An exemplary embodiment of the present invention provides an electronic document editing apparatus capable of inserting a memo into a paragraph, the electronic document editing apparatus including: a point confirming unit which, when a user points a first point of a first paragraph among a plurality of paragraphs included in an electronic document and then inputs a memo insertion command for the first point, confirms the first point of the first paragraph based on the memo insertion command; a blank space generating unit which divides the first paragraph into two paragraph blocks based on the first point and generates a blank space for inserting a memo between the two paragraph blocks; and a memo input display unit which, when the user inputs memo data for inserting a memo into the blank space, displays memo contents according to the memo data in the blank space.

Another exemplary embodiment of the present invention provides a method of operating an electronic document editing apparatus capable of inserting a memo into a paragraph, the method including: when a user points a first point of a first paragraph among a plurality of paragraphs included in an electronic document and then inputs a memo insertion command for the first point, confirming the first point of the first paragraph based on the memo insertion command; dividing the first paragraph into two paragraph blocks based on the first point and generating a blank space for inserting a memo between the two paragraph blocks; and when the user inputs memo data for inserting a memo into the blank space, displaying memo contents according to the memo data in the blank space.

Advantageous Effects

According to the electronic document editing apparatus capable of inserting a memo into a paragraph, and the operating method thereof, when a user points a first point of a first paragraph among a plurality of paragraphs included in an electronic document and then inputs a memo insertion command for the first point, the first paragraph is divided into two paragraph blocks based on the first point of the first paragraph based on the memo insertion command and a blank space for inserting a memo is generated between the two paragraph blocks, so that even though the user inputs the memo into the blank space, the text of the electronic document is prevented from being hidden by the input of the memo, and since the input memo and a paragraph or sentences corresponding to the input memo are positioned at the same position, the user is supported to view the memo and the paragraph or sentences corresponding to the memo at a glance.

DETAILED DESCRIPTION

Figure 1:
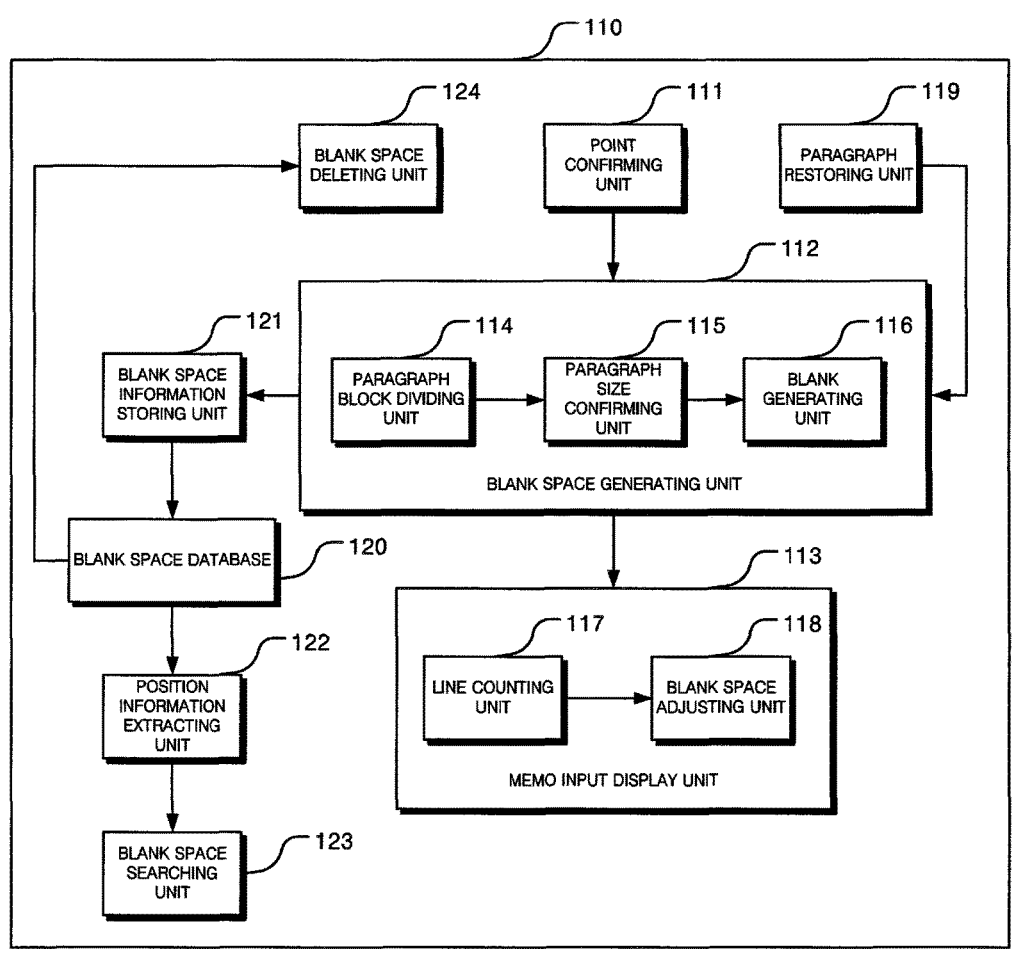
FIG. 1 is a diagram illustrating a structure of an electronic document editing apparatus capable of inserting a memo into a paragraph according to an exemplary embodiment of the present invention.

The present invention may be variously modified and have various exemplary embodiments, so that specific embodiments will be illustrated in the drawings and described in detail in the detailed description. However, it is not intended to limit the present invention to the specific embodiments, and it will be appreciated that the present invention includes all modifications, equivalences, or substitutions included in the spirit and the technical scope of the present invention. In the description of respective drawings, similar reference numerals designate similar elements.

When a component is referred to as being "connected" or "accessed" to another component, it should be understood that the component may not only be directly connected or accessed to the other component, but intervening components may also be present. In contrast, when a component is referred to as being "directly connected to" or "directly accessed to" another component, it should be understood that there is no intervening component present.

Terms used in the present application are used only to describe specific exemplary embodiments, and are not intended to limit the present invention. As used herein, the singular forms are intended to include the plural forms as well, unless the context clearly indicates otherwise. In the present application, it will be appreciated that terms "including" and "having" are intended to designate the existence of characteristics, numbers, steps, operations, components, and elements described in the specification or a combination thereof, and do not exclude a possibility of the existence or addition of one or more other characteristics, numbers, steps, operations, components, and elements, or a combination thereof in advance.

All terms used herein including technical or scientific terms have the same meanings as meanings which are generally understood by those skilled in the art unless they are differently defined. It should be construed that terms defined in a generally used dictionary have meanings matching those in the context of a related art, and the terms shall not be construed in ideal or excessively formal meanings unless they are clearly defined in the present application.

Hereinafter, exemplary embodiments of the present invention will be described in detail with reference to the accompanying drawings.

FIG. 1 is a diagram illustrating a structure of an electronic document editing apparatus capable of inserting a memo into a paragraph according to an exemplary embodiment of the present invention.

Referring to FIG. 1, an electronic document editing apparatus 110 capable of inserting a memo into a paragraph according to an exemplary embodiment of the present invention includes a point confirming unit 111, a blank space generating unit 112, and a memo input display unit 113.

Herein, the electronic document editing apparatus 110 capable of inserting the memo into the paragraph according to the exemplary embodiment of the present invention may be implemented based on various kinds of microprocessor-based devices, such as a desktop PC, a mobile terminal, a PDA, a notebook computer, and a tablet PC, which are capable of providing a function of reading, writing, or editing an electronic document.

Hereinafter, the electronic document editing apparatus 110 capable of inserting the memo into the paragraph according to the exemplary embodiment of the present invention will be described in detail with reference to FIGS. 2 to 5.

First, it is assumed that the electronic document editing apparatus 110 capable of inserting the memo into the paragraph according to the exemplary embodiment of the present invention is a touch screen-based device which is capable of receiving a touch input of a user and performing a predetermined control based on the touch input.

Figure 2:
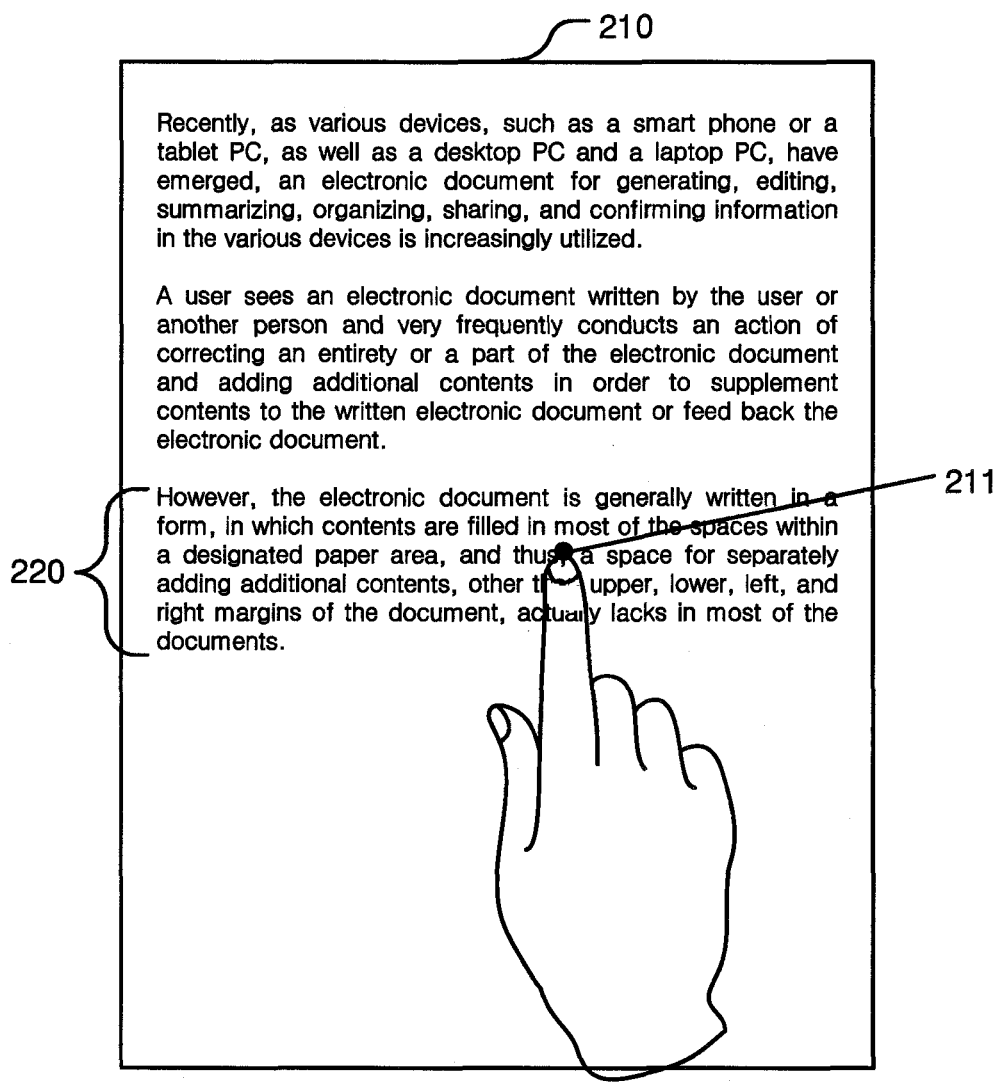
FIGS. 2 to 5 are diagrams for describing an operation of the electronic document editing apparatus capable of inserting the memo into the paragraph according to the exemplary embodiment of the present invention.

As illustrated in FIG. 2, when, in a state where the plurality of paragraphs has been input into an electronic document 210, a user points a first point 211 of a first paragraph 220 among a plurality of paragraphs included in the electronic document 210 by a touch input and then inputs a memo insertion command for the first point 211, the point confirming unit 111 may confirm the first point 211 of the first paragraph 220 based on the memo insertion command.

In this case, the memo insertion command may be input to the electronic document editing apparatus 110 capable of inserting the memo into the paragraph by performing, by the user, a predetermined gesture input, such as scrolling the touch input in a lower direction or an upper direction of a screen or scrolling the touch input in a left direction or a right direction of the screen after applying the touch input to the first point 211.

Figure 3:
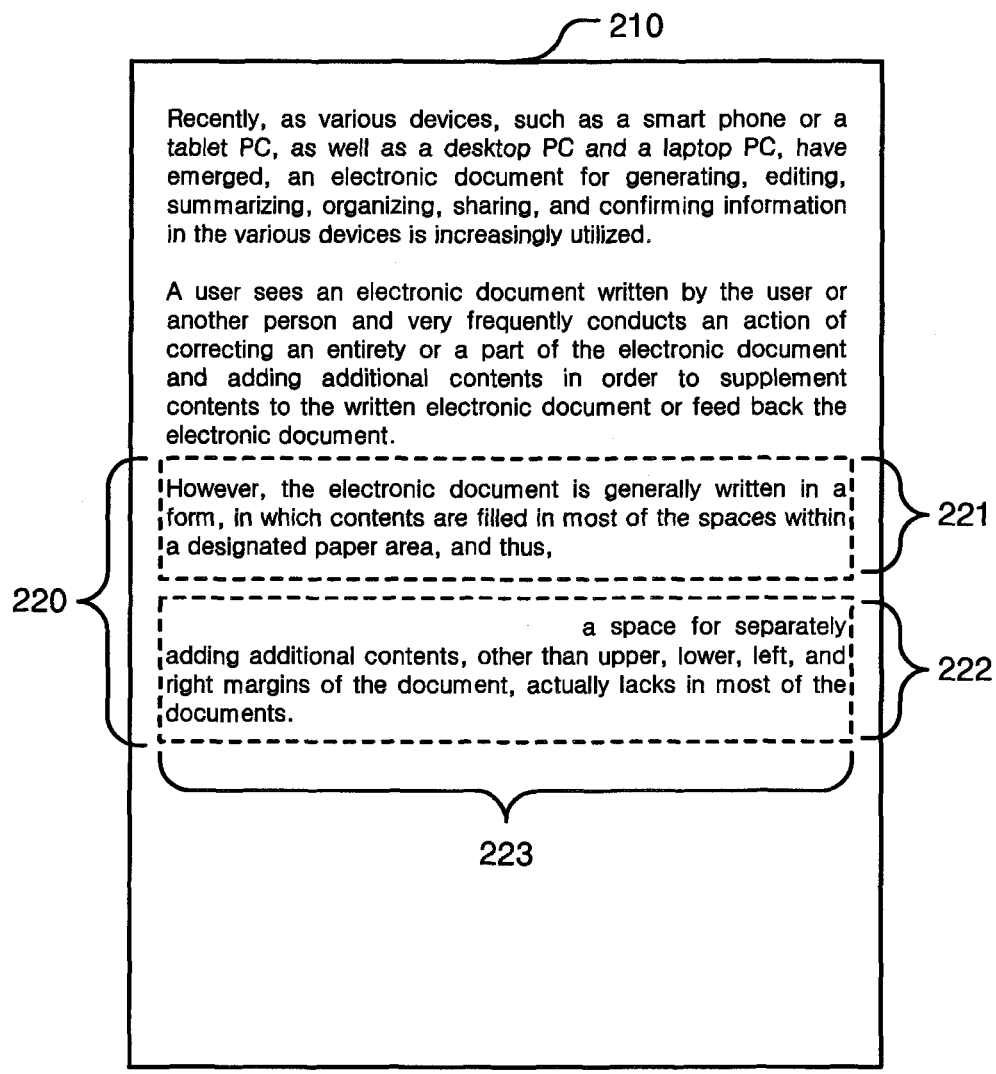
Figure 4:
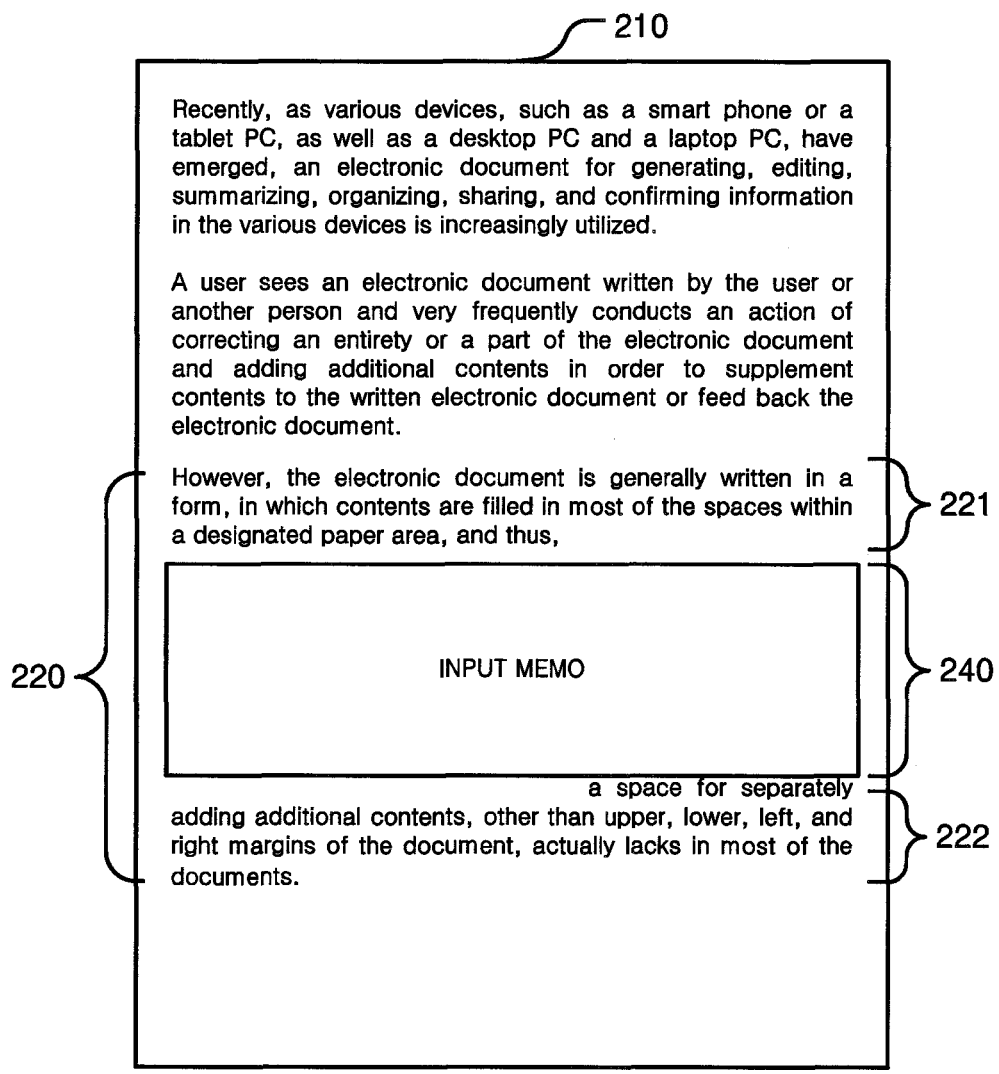

In this case, the blank space generating unit 112 may divide the first paragraph 220 into two paragraph blocks 221 and 222 based on the first point 211 and generate a blank space 240 for inserting a memo between the two paragraph blocks as illustrated in FIGS. 3 and 4.

In this case, according to the exemplary embodiment of the present invention, the blank space generating unit 112 may include a paragraph block dividing unit 114, a paragraph size confirming unit 115, and a blank generating unit 116.

The paragraph block dividing unit 114 may divide the first paragraph 220 in upper and lower directions based on the first point 211, thereby dividing the first paragraph 220 into an upper paragraph block 221 and a lower paragraph block 222 as illustrated in FIG. 3.

The paragraph size confirming unit 115 may confirm a paragraph horizontal length 223 set in the first paragraph 220 by referring to paragraph form information set in the first paragraph 220.

Then, the blank generating unit 116 may generate the blank space 240 having a predetermined vertical length and the same horizontal length as the paragraph horizontal length 223 between the upper paragraph block 221 and the lower paragraph block 222 as illustrated in FIG. 4.

As described above, when the blank space 240 is completely generated, and then the user inputs memo data for inserting a memo into the blank space 240, the memo input display unit 113 may display memo contents according to the memo data in the blank space 240.

In this case, according to the exemplary embodiment of the present invention, when the user inputs a free line according to the touch input into the blank space 240, the memo input display unit 113 may also display the free line in the blank space 240, and when the free line is a free line having a predetermined registered letter shape, the memo input display unit 113 may convert the free line into text having a letter shape corresponding to the free line and then display the converted text in the blank space 240.

In this case, according to the exemplary embodiment of the present invention, the memo input display unit 113 may include a line counting unit 117 and a blank space adjusting unit 118.

Figure 5:
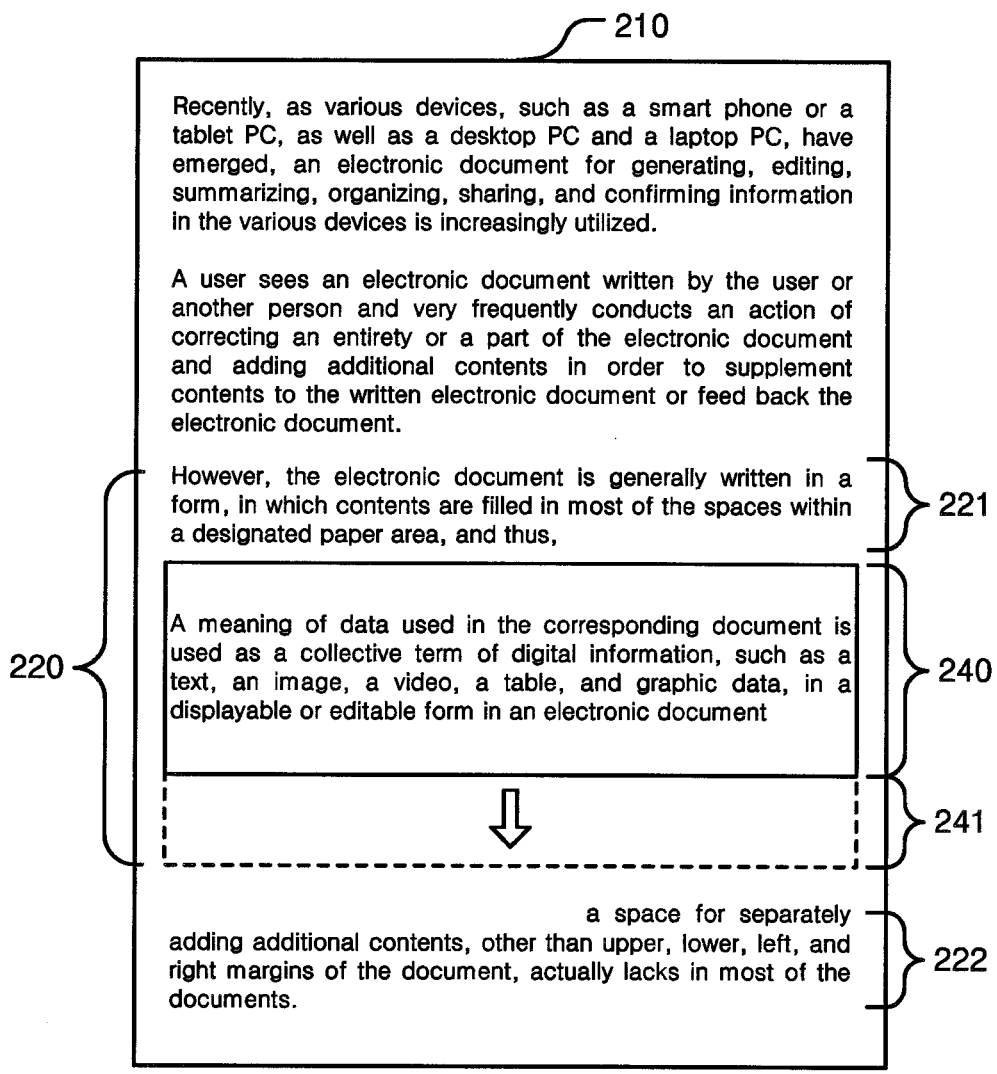

When the memo data is input into the blank space 240, the line counting unit 117 may count the number of vertical lines in which the memo contents are displayed according to the input of the memo data in the blank space 240 as illustrated in FIG. 5.

Then, when the number of vertical lines exceeds a predetermined first threshold number, the blank space adjusting unit 118 may extend 241 the predetermined vertical length of the blank space 240 by a predetermined first length.

In relation to this, when the predetermined first threshold number is "3" and the predetermined first length is "1 cm", the number of vertical lines, in which the memo contents are displayed according to the input of the memo data, on the blank space 240 is "four" as a result of the input of the memo data into the blank space 240, the blank space adjusting unit 118 may extend 241 the predetermined vertical length of the blank space 240 by "1 cm" as illustrated in FIG. 5.

In this case, when the memo data is additionally input into the blank space 240 after the predetermined vertical length of the blank space 240 is extended 241 by the predetermined first length, the line counting unit 117 may count the number of additional vertical lines in which memo contents are additionally displayed according to the additional input of the memo data in the blank space 240.

Then, when the number of additional vertical lines exceeds a predetermined second threshold number, the blank space adjusting unit 118 may additionally extend the extended vertical length of the blank space 240 by the predetermined first length.

In relation to this, when the predetermined second threshold number is "two", and the memo data is additionally input into the blank space 240 after the predetermined vertical length of the blank space 240 is extended 241 by "1 cm" as illustrated in FIG. 5, the line counting unit 117 may count the number of additional vertical lines in which the memo contents are additionally displayed according to the additional input of the memo data in the blank space 240, and when the number of additional vertical lines exceeds "two", the blank space adjusting unit 118 may additionally extend the extended vertical length of the blank space 240 by "1 cm".

By the method, the line counting unit 117 may count the number of additional vertical lines by the additionally input memo data whenever the memo data is additionally input into the blank space 240, and then when the number of additional vertical lines exceeds the predetermined second threshold number, the blank space adjusting unit 118 may additionally extend the vertical length of the blank space 240 by the predetermined first length.

Accordingly, even though the user inputs the large amount of memo data when inputting the memo data into the blank space 240, the blank space 240 is also increased according to the large amount of memo data, so that the user is supported to view all of the memo contents through the blank space 240 at a glance.

In this case, according to the exemplary embodiment of the present invention, when the number of vertical lines is the predetermined first threshold number or less according to the deletion of the memo data input into the blank space 240 after the predetermined vertical length of the blank space 240 is extended 241 by the predetermined first length, the blank space adjusting unit 118 may contract the extended vertical length of the blank space 240 by the predetermined first length again and restore the vertical length of the blank space 240 to the predetermined vertical length as illustrated in FIG. 5.

According to the exemplary embodiment of the present invention, the electronic document editing apparatus 110 capable of inserting the memo into the paragraph may further include a paragraph restoring unit 119.

When the user inputs a hiding command for the blank space 240, the paragraph restoring unit 119 may restore the original first paragraph 220 illustrated in FIG. 2 by combining the two paragraph blocks 221 and 222 into one paragraph based on the first point 211.

In this case, when the user inputs a display command for the blank space 240 after the first paragraph 220 is restored based on the hiding command, the blank space generating unit 112 may divide the restored first paragraph 220 into the two paragraph blocks 221 and 222 based on the first point 221 and display the blank space 240 again, and display the memo contents according to the memo data input into the blank space 240.

That is, the user may perform fold and unfold the blank space 240 by applying a touch input and the like scrolling in an upper direction or a lower direction of the screen after the blank space 240 is generated in the electronic document 210.

According to the exemplary embodiment of the present invention, the electronic document editing apparatus 110 capable of inserting the memo into the paragraph may further include a blank space database 120, a blank space information storing unit 121, a position information extracting unit 122, and a blank space searching unit 123.

Position information in the electronic document 210 of the plurality of blank spaces generated in the electronic document 210 is matched with identifiers of the plurality of blank spaces, respectively, and the position information of the plurality of blank spaces and the identifiers for the plurality of blank spaces are stored in the blank space database 120.

In relation to this, when the blank space 240 illustrated in FIG. 4 is generated for a plurality of paragraphs in the electronic document 210, information represented in Table 1 below may be stored in the blank space database 120.

TABLE 1

| Position information of plurality of blank spaces | Identifier |
|---|---|
| Position information of blank space 1 | Identifier 1 |
| Position information of blank space 2 | Identifier 2 |
| ... | ... |

In this case, when the blank space 240 is generated for the first paragraph 220 as illustrated in FIG. 4, the blank space information storing unit 121 may generate an identifier for the blank space 240, and match position information of the blank space 240 in the electronic document with the identifier for the blank space 240 and store the position information of the blank space 240 and identifier for the blank space 240 in the blank space database 120.

Then, when the user inputs a search command for the blank space 240 based on the identifier for the blank space 240 among the plurality of blank spaces generated in the electronic document 210, the position information extracting unit 122 may extract the position information of the blank space 240, which is stored while being matched with the identifier for the blank space 240, from the blank space database 120.

Then, the blank space searching unit 123 may shift a screen display point of the electronic document 210 displayed on the screen to a point, at which the blank space 240 is positioned, based on the position information of the blank space 240.

That is, when the screen display point of the electronic document 210 currently displayed on the screen is a portion of page 1 of the electronic document 210 and the blank space 240 is positioned at an intermediate position of page 5 of the electronic document, the position information extracting unit 122 may extract the position information of the blank space 240, which is stored while being matched with the identifier for the blank space 240, from the blank space database 120 based on the search command for the blank space 240 by the user, and then the blank space searching unit 123 may shift a display point in page 1 of the electronic document 210 displayed on the screen to the intermediate point of page 5 of the electronic document 210, at which the blank space 240 is positioned, based on the position information of the blank space 240.

In this case, according to the exemplary embodiment of the present invention, the electronic document editing apparatus 110 capable of inserting the memo into the paragraph may further include a blank space deleting unit 124.

When the user inputs a deletion command for one or more blank spaces based on identifiers for the one or more blank spaces among the plurality of blank spaces, the blank space deleting unit 124 may confirm position information of the one or more blank spaces stored while being matched with the identifiers for the one or more blank spaces in the blank space database 120, and delete the one or more blank spaces in the electronic document 210 in a lump.

That is, when the user inputs the deletion command for "blank space 1, blank space 2, and blank space 3" among the plurality of blank spaces, the blank space deleting unit 124 may confirm position information of "blank space 1, blank space 2, and blank space 3" stored while being matched with identifiers for the "blank space 1, blank space 2, and blank space 3" in the blank space database 120 and delete "blank space 1, blank space 2, and blank space 3" in the electronic document 210 in a lump.

In the present exemplary embodiment, only the configuration for the search and the deletion for the blank spaces included in the electronic document 210 through the blank space database 120 is mentioned, but according to an expanded exemplary embodiment of the present invention, the electronic document editing apparatus 110 capable of inserting the memo into the paragraph may manage the blank space database 120, in which the position information in the electronic document 210 of the plurality of blank spaces generated in the electronic document 210 is matched with the identifiers for the plurality of blank spaces, respectively, and the position information of the plurality of blank spaces and the identifiers for the plurality for blank spaces are stored, to provide a management function of processing a correction of the memo contents included in the blank spaces, a change in a size of the blank space, and the like, as well as the search and the deletion of the plurality of blank spaces generated in the electronic document 210 in a lump.

In the foregoing, the structure of the electronic document editing apparatus 110 capable of inserting the memo into the paragraph according to the present invention illustrated in FIG. 1 has been described in detail with reference to FIGS. 2 to 5. In the exemplary embodiment illustrated in FIGS. 2 to 5, the example, in which the electronic document editing apparatus 110 capable of inserting the memo into the paragraph divides the first paragraph 220 in upper and lower directions and generates the blank space 240, has been described, but according to another exemplary embodiment of the present invention, the electronic document editing apparatus 110 capable of inserting the memo into the paragraph may also be configured to horizontally divide the first paragraph 220 into a left paragraph block and a right paragraph block, and then generate the blank space 240 between the left paragraph block and the right paragraph block.

Finally, the electronic document editing apparatus 110 capable of inserting the memo into the paragraph according to the present invention may divide the first paragraph 220 into the two paragraph blocks 221 and 221 based on the first point 211 of the first paragraph 220 based on the memo insertion command when the user inputs the memo insertion command for the first point 211 after the first point 221 of the first paragraph 220 among the plurality of paragraphs included in the electronic document 210 is pointed, and generate the blank space 240 for inserting a memo between the two paragraph blocks 221 and 222, so that even though the user inputs the memo into the blank space 240, the text of the electronic document 210 is not hidden by the input of the memo, and the input memo and the paragraph or sentences corresponding to the input memo are present at the same position, thereby supporting the user to view the memo and the paragraph or sentences corresponding to the memo at a glance.

Figure 6:
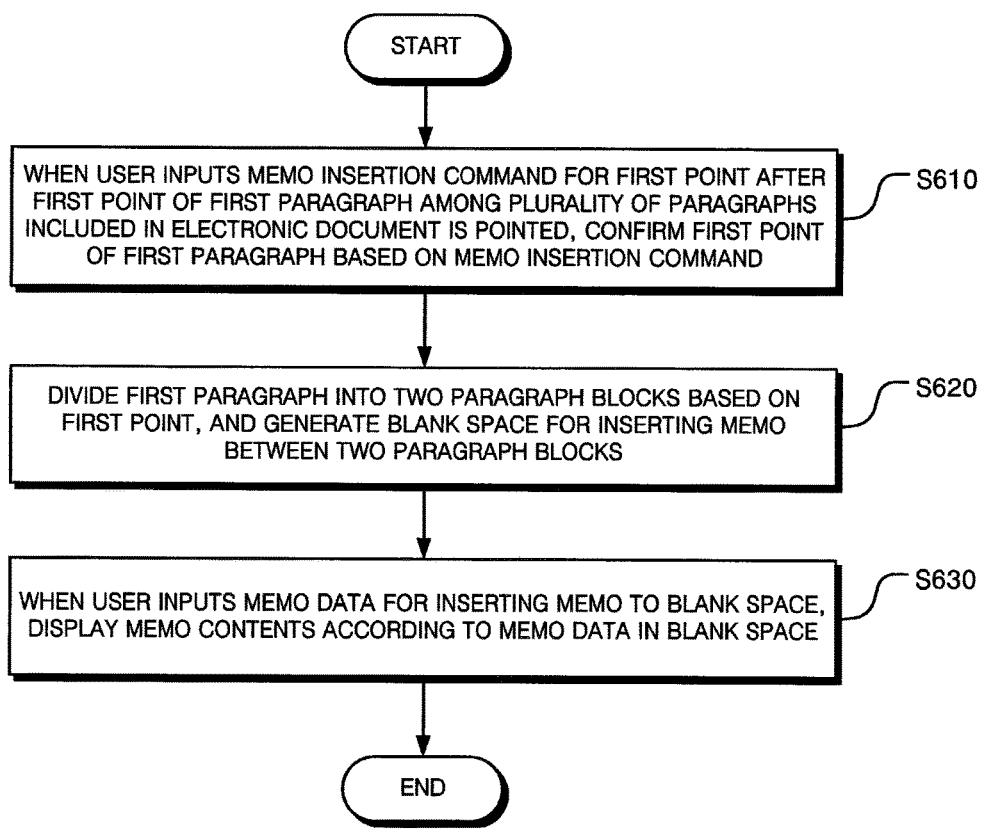
FIG. 6 is a flowchart illustrating an operating method of an electronic document editing apparatus capable of inserting a memo into a paragraph according to an exemplary embodiment of the present invention.

FIG. 6 is a flowchart illustrating an operating method of an electronic document editing apparatus capable of inserting a memo into a paragraph according to an exemplary embodiment of the present invention.

In operation S610, when a user inputs a memo insertion command for a first point after the first point of a first paragraph among a plurality of paragraphs included in an electronic document is pointed, the first point of the first paragraph is confirmed based on the memo insertion command.

In operation S620, the first paragraph is divided into two paragraph blocks based on the first point, and a blank space for inserting a memo is generated between the two paragraph blocks.

In operation S630, when the user inputs memo data for inserting the memo into the blank space, memo contents according to the memo data are displayed in the blank space.

In this case, according to the exemplary embodiment of the present invention, operation S620 may include an operation of dividing the first paragraph in upper and lower directions based on the first point to divide the first paragraph into an upper paragraph block and a lower paragraph block, an operation of confirming a paragraph horizontal length set in the first paragraph by referring to paragraph form information set in the first paragraph, and an operation of generating the blank space having a predetermined vertical length and the same horizontal length as the paragraph horizontal length between the upper paragraph block and the lower paragraph block.

In this case, operation S630 may include an operation of counting the number of vertical lines in which the memo contents are displayed according to the input of the memo data in the blank space when the memo data is input into the blank space, an operation of, when the number of vertical lines exceeds a predetermined first threshold number, extending the predetermined vertical length of the blank space by a predetermined first length, an operation of, when the memo data is additionally input into the blank space after the predetermined vertical length of the blank space is extended by the predetermined first length, counting the number of additional vertical lines in which memo contents are additionally displayed according to the additional input of the memo data in the blank space, and an operation of, when the number of additional vertical lines exceeds a predetermined second threshold number, additionally extending the extended vertical length of the blank space by the predetermined first length.

In this case, according to the exemplary embodiment of the present invention, operation S630 may further include an operation of, when the number of vertical lines is the predetermined first threshold number or less according to the deletion of the memo data input into the blank space after the predetermined vertical length of the blank space is extended by the predetermined first length, contracting the extended vertical length of the blank space by the predetermined first length.

According to the exemplary embodiment of the present invention, the operating method of the electronic document editing apparatus capable of inserting the memo into the paragraph may further include, after operation S630, an operation of, when the user inputs a hiding command for the blank space, restoring the first paragraph by combining the two paragraph blocks into one paragraph based on the first point, and an operation of, when the user inputs a display command for the blank space after the first paragraph is restored based on the hiding command, dividing the restored first paragraph into the two paragraph blocks based on the first point and displaying the blank space again, and displaying the memo contents according to the memo data input into the blank space.

According to the exemplary embodiment of the present invention, the operating method of the electronic document editing apparatus capable of inserting the memo into the paragraph may further include, an operation of maintaining a blank space database in which position information in the electronic document of the plurality of blank spaces generated in the electronic document is matched with identifiers of the plurality of blank spaces, respectively, and the position information the plurality of blank spaces and the identifiers for the plurality of blank spaces are stored, an operation of, when the blank space is generated for the first paragraph, generating an identifier for the blank space, and matching the position information in the electronic document of the blank space with the identifier for the blank space and storing the position information of the blank space and the identifier for the blank space in the blank space database, an operation of, when the user inputs a search command for the blank space based on the identifier for the blank space among the plurality of blank spaces, extracting the position information of the blank space, which is stored while being matched with the identifier for the blank space, from the blank space database, and an operation of shifting a screen display point of the electronic document displayed on the screen to a point, at which the blank space is positioned, based on the position information of the blank space.

According to the exemplary embodiment of the present invention, the operating method of the electronic document editing apparatus capable of inserting the memo into the paragraph may further include an operation of, when the user inputs a deletion command for one or more blank spaces based on identifier for the one or more blank spaces among the plurality of blank spaces, confirming position information of the one or more blank spaces stored while being matched with the identifier for the one or more blank spaces in the blank space database, and deleting the one or more blank spaces in the electronic document in a lump.

In the foregoing, the operating method of the electronic document editing apparatus capable of inserting the memo into the paragraph according to the exemplary embodiment of the present invention has been described with reference to FIG. 6. Here, the operating method of the electronic document editing apparatus capable of inserting the memo into the paragraph according to the exemplary embodiment of the present invention may correspond to the configuration of the operation of the electronic document editing apparatus 110 capable of inserting the memo into the paragraph described with reference to FIGS. 1 to 5, so that a more detailed description thereof will be omitted.

The operating method of the electronic document editing apparatus capable of inserting the memo into the paragraph according to the exemplary embodiment of the present invention may be implemented by a computer program stored in a storage medium for executing the method through a combination with a computer.

The operating method of the electronic document editing apparatus capable of inserting the memo into the paragraph according to the exemplary embodiment of the present invention may be implemented in a form of a program command executable through various computer means and may be recorded in a computer readable medium. The computer readable medium may include one or a combination of a program command, a data file, and a data structure. The program command recorded in the medium may be specially designed and configured for the present invention, or may be publicly known to and used by those skilled in the computer software field. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler. The hardware device may be configured to be operated with one or more software modules in order to perform the operation of the present invention, and an opposite situation thereof is available.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. An electronic document editing apparatus capable of inserting a memo into a paragraph, the electronic document editing apparatus comprising:
    a blank space database in which position information in an electronic document of a plurality of blank spaces generated in the electronic document is matched with identifiers for the plurality of blank spaces, respectively, and the position information of the plurality of blank spaces and the identifiers for the plurality of blank spaces are stored;
    a point confirming unit which, when a user points a first point in a text line of a first paragraph among a plurality of paragraphs included in the electronic document and then inputs a memo insertion command for the first point, confirms the first point of the first paragraph based on the memo insertion command;
    a blank space generating unit which divides the first paragraph into upper and lower paragraph blocks based on the first point and generates a blank space for inserting a memo between the paragraph blocks, wherein the upper paragraph block includes a first portion of the text line located left to the first point and the lower paragraph block includes a second portion of the text line located right to the first point;
    a memo input display unit which, when the user inputs memo data for inserting a memo into the blank space, displays memo contents according to the memo data in the blank space;
    a blank space information storing unit which, when the blank space is generated for the first paragraph, generates an identifier for the blank space, and matches position information of the blank space with the identifier for the blank space and stores the position information of the blank space and the identifier for the blank space in the blank space database;
    a position information extracting unit which, when the user inputs a search command for the blank space based on the identifier for the blank space among the plurality of blank spaces, extracts the position information of the blank space, which is stored while being matched with the identifier for the blank space, from the blank space database;
    a blank space searching unit which shifts a screen display point of the electronic document displayed on a screen to a point, at which the blank space is positioned, based on the position information of the blank space;
    a paragraph restoring unit which, when the user inputs a hiding command for the blank space, restores the first paragraph by combining the two paragraph blocks into one paragraph based on the first point, wherein when the user inputs a display command for the blank space after the first paragraph is restored based on the hiding command, the blank space generating unit divides the restored first paragraph into the two paragraph blocks based on the first point and displays the blank space again, and displays the memo contents according to the memo data input into the blank space; and
    a blank space deleting unit which, when the user inputs a deletion command for more than one blank spaces based on identifiers for the blank spaces among the plurality of blank spaces, confirms position information of the blank spaces stored while being matched with the identifiers for the blank spaces in the blank space database, and deletes the blank spaces in the electronic document in a lump.

2. The electronic document editing apparatus of claim 1, wherein the blank space generating unit includes:
    a paragraph block dividing unit which divides the first paragraph in upper and lower directions based on the first point to divide the first paragraph into the upper paragraph block and the lower paragraph block;
    a paragraph size confirming unit which confirms a paragraph horizontal length set in the first paragraph by referring to paragraph form information set in the first paragraph; and
    a blank generating unit which generates the blank space having a predetermined vertical length and the same horizontal length as the paragraph horizontal length between the upper paragraph block and the lower paragraph block.

3. The electronic document editing apparatus of claim 2, wherein the memo input display unit further includes:
    a line counting unit which, when the memo data is input into the blank space, counts the number of vertical lines in which the memo contents are displayed according to the input of the memo data in the blank space; and
    a blank space adjusting unit, when the number of vertical lines exceeds a predetermined first threshold number, extends the predetermined vertical length of the blank space by a predetermined first length,
    wherein when the memo data is additionally input into the blank space after the predetermined vertical length of the blank space is extended by the predetermined first length, the line counting unit counts the number of additional vertical lines in which memo contents are additionally displayed according to the additional input of the memo data in the blank space, and
    wherein when the number of additional vertical lines exceeds a predetermined second threshold number, the blank space adjusting unit additionally extends the extended vertical length of the blank space by the predetermined first length.

4. The electronic document editing apparatus of claim 3, wherein when the number of vertical lines is the predetermined first threshold number or less according to the deletion of the memo data input into the blank space after the predetermined vertical length of the blank space is extended by the predetermined first length, the blank space adjusting unit contracts the extended vertical length of the blank space by the predetermined first length.

5. A method of operating an electronic document editing apparatus capable of inserting a memo into a paragraph, the method comprising:
    maintaining a blank space database in which position information in an electronic document of a plurality of blank spaces generated in the electronic document is matched with identifiers for the plurality of blank spaces, respectively, and the position information of the plurality of blank spaces and the identifiers for the plurality of blank spaces are stored;

when a user points a first point in a text line of a first paragraph among a plurality of paragraphs included in the electronic document and then inputs a memo insertion command for the first point, confirming the first point of the first paragraph based on the memo insertion command;

dividing the first paragraph into upper and lower paragraph blocks based on the first point and generating a blank space for inserting a memo between the paragraph blocks, wherein the upper paragraph block includes a first portion of the text line located left to the first point and the lower paragraph block includes a second portion of the text line located right to the first point;

when the user inputs memo data for inserting a memo into the blank space, displaying memo contents according to the memo data in the blank space;

when the blank space is generated for the first paragraph, generating an identifier for the blank space, and matching position information of the blank space with the identifier for the blank space and storing the position information of the blank space and the identifier for the blank space in the blank space database;

when the user inputs a search command for the blank space based on the identifier for the blank space among the plurality of blank spaces, extracting the position information of the blank space, which is stored while being matched with the identifier for the blank space, from the blank space database;

shifting a screen display point of the electronic document displayed on a screen to a point, at which the blank space is positioned, based on the position information of the blank space;

when the user inputs a hiding command for the blank space, restoring the first paragraph by combining the two paragraph blocks into one paragraph based on the first point;

when the user inputs a display command for the blank space after the first paragraph is restored based on the hiding command, dividing the restored first paragraph into the two paragraph blocks based on the first point and displaying the blank space again, and displaying the memo contents according to the memo data input into the blank space; and when the user inputs a deletion command for more than one blank spaces based on identifiers for the blank spaces among the plurality of blank spaces, confirming position information of the blank spaces stored while being matched with the identifier for the blank spaces in the blank space database, and deleting the blank spaces in the electronic document in a lump.

6. The method of claim 5, wherein the generating of the blank space includes:
dividing the first paragraph in upper and lower directions based on the first point to divide the first paragraph into the upper paragraph block and the lower paragraph block;
confirming a paragraph horizontal length set in the first paragraph by referring to paragraph form information set in the first paragraph; and
generating the blank space having a predetermined vertical length and the same horizontal length as the paragraph horizontal length between the upper paragraph block and the lower paragraph block.

7. The method of claim 6, wherein the displaying of the memo contents includes:
when the memo data is input into the blank space, counting the number of vertical lines in which the memo contents are displayed according to the input of the memo data in the blank space;
when the number of vertical lines exceeds a predetermined first threshold number, extending the predetermined vertical length of the blank space by a predetermined first length;
when the memo data is additionally input into the blank space after the predetermined vertical length of the blank space is extended by the predetermined first length, counting the number of additional vertical lines in which memo contents are additionally displayed according to the additional input of the memo data in the blank space; and
when the number of additional vertical lines exceeds a predetermined second threshold number, additionally extending the extended vertical length of the blank space by the predetermined first length.

8. The method of claim 7, wherein the displaying of the memo contents further includes, when the number of vertical lines is the predetermined first threshold number or less according to the deletion of the memo data input into the blank space after the predetermined vertical length of the blank space is extended by the predetermined first length, contracting the extended vertical length of the blank space by the predetermined first length.

* * * * *